United States Patent Office.

HENRY A. WILLIAMS, OF ST. LOUIS, MISSOURI, ASSIGNOR TO HIMSELF AND BENJAMIN H. CHADBOURNE.

*Letters Patent No. 68,328, dated August 27, 1867.*

IMPROVEMENT IN REFINING SUGAR AND SIRUPS.

*The Schedule referred to in these Letters Patent and making part of the same.*

TO ALL WHOM IT MAY CONCERN:

Be it known that I, HENRY A. WILLIAMS, of the city and county of St. Louis, and State of Missouri, have invented a new and improved Clarifying Compound for the manufacture and refining of crystallizable sugar and sirup from sorghum-cane juice, which I denominate and call "Sorgo Defecant;" and I do hereby declare the following to be a full, clear, and exact description of the ingredients, and their proportions, used in preparing said compound, and also the mode of employing the same for the purposes above specified.

To a tank containing one hundred gallons of sorghum-cane juice, neutralized by means of milk of lime, I add the following: one-fourth of an ounce of tannic acid, one-half ounce of powdered slippery elm bark, four ounces of sulphite of lime, four ounces of alumina.

I mix the whole intimately with the juice, and heat the mixture to a boil and remove the scum. I then filter the hot liquid through cloth or bone-black, according to the color and quality of sugar and sirup sought for. After filtration I evaporate the clarified liquor in a shallow pan, and avoid scorching, to a point the which will permit of its crystallization, to 230° to 235° Fahrenheit for sugar, and to 228° Fahrenheit for sirup.

The tannin, assisted by the elm bark, has the property of separating in an insoluble form from the juice all glutinous, gummy, or waxy matters, together with other impurities separated by the alumina and sulphite of lime, which hinder the crystallization, and are thrown up, when heat is applied, to be carried off with the scum, rendering a purely clarified liquor, which, upon proper evaporation, will make crystallizable sugar.

The alumina is employed to decolorize the juice, and the sulphite of lime to prevent fermentation, as well as to prevent the sirup and sugar from acquiring color.

What I claim as new, and my invention, and desire to secure by Letters Patent, is—

A combination of the ingredients used in preparing said compound, in about the proportions herein named, and for the purposes set forth.

In witness whereof I have signed my name to this specification in the presence of two subscribing witnesses.

HENRY A. WILLIAMS.

Witnesses:
F. D. LOVELL,
M. S. LIBBY.